United States Patent [19]

Banks

[11] 4,386,784
[45] Jun. 7, 1983

[54] MAGNETIC SEAL WITH MAGNETIC POWDER HELD IN POLE PIECE GAP

[75] Inventor: Michael D. Banks, Conventry, England

[73] Assignee: Rolls-Royce Limited, London, England

[21] Appl. No.: 320,561

[22] Filed: Nov. 12, 1981

[30] Foreign Application Priority Data

Nov. 25, 1980 [GB] United Kingdom ............... 8037791

[51] Int. Cl.³ .................. F16J 15/40; F16J 15/16
[52] U.S. Cl. ................................. 277/80; 277/53; 415/172 R; 415/174
[58] Field of Search ............ 277/53, 54, 80, 1; 415/170 R, 172 R, 172 A, 174

[56] References Cited

U.S. PATENT DOCUMENTS

| 2,834,618 | 5/1958 | Wiltse | 277/80 X |
| 3,097,853 | 7/1963 | McHugh | 277/80 X |
| 4,057,362 | 11/1977 | Schwaebel | 415/172 A X |
| 4,304,411 | 12/1981 | Wilcock et al. | 277/80 |

FOREIGN PATENT DOCUMENTS

| 267656 | 11/1963 | Australia | 277/80 |
| 783881 | 10/1957 | United Kingdom | 277/80 |
| 2042928A | 10/1980 | United Kingdom | 415/174 |
| 368434 | 3/1973 | U.S.S.R. | 277/80 |

Primary Examiner—Robert S. Ward, Jr.
Attorney, Agent, or Firm—Cushman, Darby & Cushman

[57] ABSTRACT

A seal for use in rotating machinery such as a gas turbine engine comprises two pole pieces attached to the engine casing and defining a gap in which a magnetic powder is held by a magnetic field generated by a permanent magnet, electro-magnet or a combination of the two. The non-magnetic fins of the adjacent rotor (e.g. turbine blades), extend into the gap and distort the magnetic field so that while there is a small clearance between the fin and the powder, this small clearance can be maintained approximately the same whatever the position of the fin in the gap. A seeding tube allows magnetic powder to be supplied to the gap to make good any loss of powder.

9 Claims, 3 Drawing Figures

MAGNETIC SEAL WITH MAGNETIC POWDER HELD IN POLE PIECE GAP

This invention relates to a seal which may be used between the casing or some other fixed structure of a rotating machine and a rotary part of the machine e.g. a seal between the blade tips of a turbine and the turbine housing of a gas turbine engine.

The efficiency of a gas turbine engine is a function amongst other factors, of the clearance between the engine casing and the rotating blade rows of the engine compressor and turbine, in particular the clearance between the blade tips of the engine turbine and the turbine casing. The energy of the hot, high pressure gases from the engine combustion system is converted by reaction with the turbine blades and the energy of any of this gas which escapes through this clearance is wasted, since it does not react with the blades. Hence efficiency is adversely affected. There have been a number of proposals to control or minimise the effect of the clearance, involving attempts to induce a counter-flow of gas in the clearance, abradable seals mounted in the casing so that the blades cut their own path in the seal, physically moving the turbine shaft and disc, and thus the blades in an axial direction, and controlling the diameter of the casing.

The difficulty in providing an effective seal is that the different thermal response rates of the casing, blades and discs, and the axial movements of the turbine shaft, which occur over the engine operating range and when certain engine manoeuvres and performed, mean that the gap between the blades and the casing has a wide dimensional variation both axially and circumferentially. Whilst the clearance problems of gas turbine engines have been highlighted with respect to the turbine tip clearance, similar problems exist in relation to other parts of the turbine and to the compressor and the present invention is intended to provide a seal suitable for many applications.

The present invention seeks to provide a seal between a fixed structure and rotating structure in which the gap to be sealed between the structures contains a compliant, medium the geometric shape of which can be varied as necessary to minimise or prevent the leakage of a gas through the gap by compensating for differential movements between the structures which otherwise would cause variations in the gap size.

Accordingly, the present invention provides a seal for use between a fixed structure and a rotatable structure to restrict the leakage of gas between the two structures, the seal comprising a casing, magnetic pole pieces mounted in the casing, a gap being defined between the pole pieces, means for generating a magnetic field across the gap, a magnetic powder located in the gap and held therein by a magnetic field, means for making good any loss of powder, the rotatable structure being non-magnetic and at least a part of the rotatable structure extending into the gap.

The means for generating the magnetic field may be a permanent magnet, an electro-magnet or a combination of permanent and electro-magnets.

The gap may be divided into pockets by non-magnetic fences extending between the pole pieces, and the gap may be partly closed by an abradable seal element to assist in retaining the magnetic powder in the gap.

The fixed structure may be a casing or some other fixed part of a gas turbine engine and the rotating structure may be a turbine of a gas turbine engine.

The gap may comprise the clearance between the blade tips, or fins which extend from the blade tips, of the turbine of a gas turbine engine and the engine turbine casing.

Means may be provided to supply powder to the gap, either at fixed time intervals, after particular engine operations, or in dependence of the seal efficiency.

The magnetic powder which must have a suitable Curie temperature, may be selected from the following group, Ni, Fe. Co or their chemical compounds or any combination from these groups.

The present invention will now be more particularly described with reference to the accompanying drawings in which, FIG. 1 shows a gas turbine engine incorporating a radial seal and a face seal according to the present invention.

Figure 1:
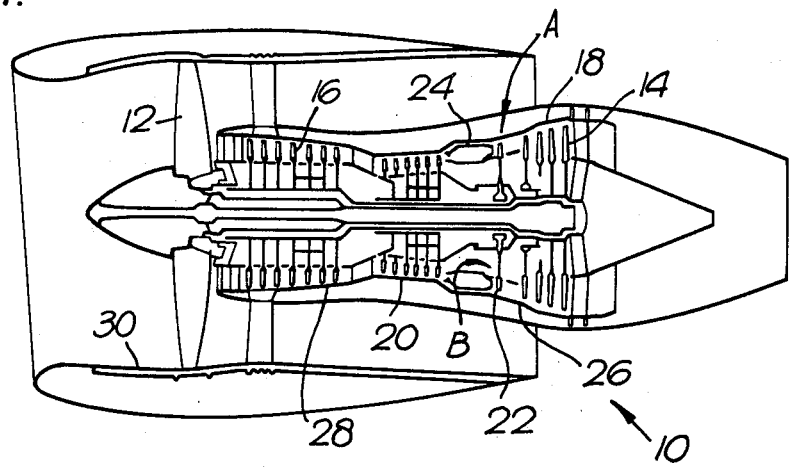

Referring to the Figures, a gas turbine engine 10 which is of the high bypass ratio turbofan type comprises a fan 12 driven by a low pressure turbine 14, an intermediate pressure compressor 16 driven by an intermediate pressure turbine 18, a high pressure compressor 20 driven by a high pressure turbine 22, and combustion apparatus 24. The turbines 14, 18 and 22 have a casing 26, the compressors 16 and 20 having a casing 28 and the fan 12 has a casing 30.

Figure 2:
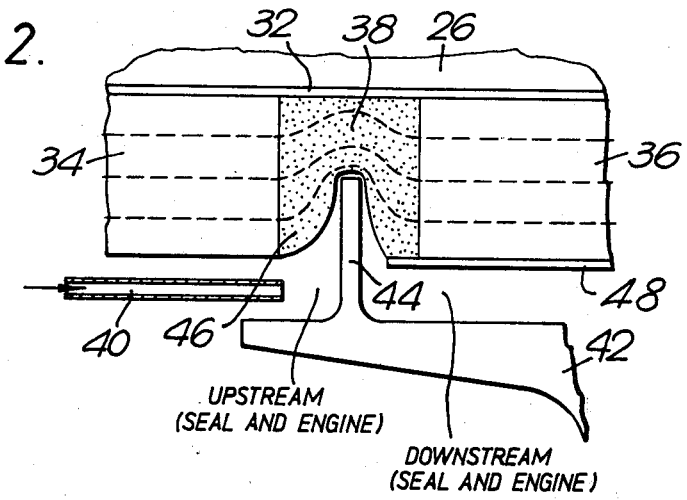
FIG. 2 shows diagrammatically the radial seal of FIG. 1 to a larger scale.
Figure 3:
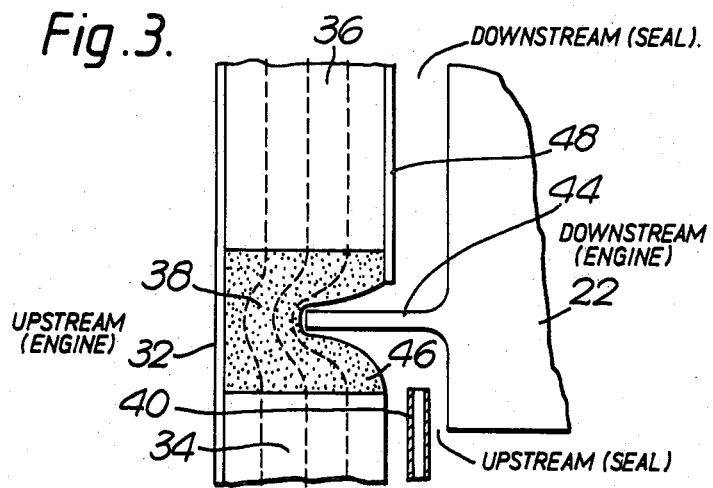
FIG. 3 shows the face seal of FIG. 1 to a larger scale.

The two forms of seal illustrated in FIGS. 2 and 3 are located at points A and B respectively in FIG. 1, which correspond to the tip of the high pressure turbine 22 and the upstream face of the high pressure turbine.

Referring to FIG. 2, the seal comprises a non-magnetic gas tight sealing strip 32 attached to the casing 26, upstream and downstream annular magnetic pole pieces 34, 36 respectively which between them define a gap 38, and a seeding tube 40 for supplying magnetic powder to the gap 38. The turbine 22 has a row of blades, the shroud 42 of one of which has a sealing fin 44 which extends into the gap 38. At least the fins 44 of all the blades must be non-magnetic and preferably the blades and disc of the turbine 22 should also be non-magnetic. As a practical matter, the materials which are generally used for these components are non-magnetic.

The pole pieces 34, 36 are magnetised either by being part of a permanent magnet or part of an electro-magnet. Alternatively, a combination of permanent and electro-magnets can be used to generate a magnetic field across the gap 38.

Magnetic powder 46 supplied through the seeding tube 40 fills the gap 38 and is held firmly in position by the magnetic field between the pole pieces and so forms a stable annular surface adjacent to the tip of the fin 44. The sealing strip 32 which straddles the pole pieces allows the seal assembly to operate as a gas tight casing and to provide support for the magnetic powder. Any powder loss during operation of the seal may be minimised by means of a thin annular strip 48 attached to the downstream pole piece 36, which projects towards the fin 44, so that the fin abrades the strip during transient conditions and so creating a minimum gap.

The bulk of the powder can also be supported circumferentially by means of non-magnetic fences (not shown) extending between the pole pieces and sufficiently thin to be abraded by axial and radial excursions of the fin.

It is inevitable that some fin excursions will result in an excessive gap adjacent to the fin tip, and also that some magnetic powder will be lost during engine operation. A means of supplying fresh powder during operation to maintain minimum gap and make good losses is required. This can be by means of a number of seeding tubes 40 circumferentially spaced and terminating close to the fin on the high pressure side of the seal, so that the emergent powder is distributed circumferentially by the swirl component on the adjacent gas, caused by the viscous drag on the rotor 22 and carried into the seal by the leakage flow through the seal.

The control system (not shown) to control the supply of magnetic powder to the seeding tubes can be either a passive or an active system. The passive system can be arranged to provide magnetic powder continuously, or following particular seal operating manoeuvres (i.e. those resulting in axial and/or radial excursions of the fin relative to the casing) or at fixed time intervals during steady state operation of the seal.

The active control system would assess the seal integrity e.g. by monitoring pressure drop across the seal, and only sealing the gap when seal performance becomes unacceptable.

In order to retain dimensional stability, the magnetic powder must resist the shear forces induced by the circumferential viscous drag of the air film around the rotating fin 44, and also the seal leakage. The resistance of the powder to erosion arises mainly on the normal force of the magnetic attraction between the particles and the choice of a magnetic powder in which the powder particles have a good coefficient of friction.

The seal performance can be optimised by maximising the cohesion of the powder adjacent to the tip of the fin 44, which means that the magnetic field in the gap must be strongest in this region. The fin tip should therefore run at a position close to the middle of the gap 38. The completion of the magnetic circuit by the powder between the poles and the high reluctance of the fin will distort the field (as illustrated) naturally to concentrate in the powder over the fin tip, thereby ensuring maximum particle cohesion in the region most needing it.

The magnetic powder must be selected having an appropriate Curie temperature to ensure that the powder retains its magnetic properties at all engine conditions. During seal rub which could occur during seeding frictional heating of the powder in contact with the fin may cause the powder locally to exceed the Curie temperature. The top layer of powder will be carried away by seal air leakage, so creating a clearance and removing the source of heating. Thus the seal effectively is self-adjusting.

A suitable magnetic powder could be either nickel, iron or cobalt which have Curie temperatures of 358° C., 770° C. and 1127° C. respectively, depending on the local operating temperature.

The form of seal shown in FIG. 3 is constructed and operates in a similar way to the form shown in FIG. 2 and the same components have been given the same reference number. The difference between the two forms is that the one shown in FIG. 3 is for use on the face of the turbine rotor 22.

The invention has been described particularly in relation to the high pressure turbine of a gas turbine engine but it can be applied to other parts of an engine and in other forms of machinery.

What we claim is:

1. A seal for use between a fixed structure and a rotatable structure to restrict the leakage of gas between the two structures, the seal comprising a casing, magnetic pole-pieces mounted in the casing, a gap being defined between the pole pieces, means for generating a magnetic field across the gap, a magnetic powder located in the gap and held therein by a magnetic field, a means for making good lost powder, the rotatable structure being non-magnetic and at least a part of the rotatable structure extending into the gap.

2. A seal as claimed in claim 1 in which the means for generating the magnetic field comprises a permanent magnet.

3. A seal as claimed in claim 1 in which the means for generating a magnetic field comprises an electro-magnet.

4. A seal as claimed in claim 1 in which the means for generating the magnetic field comprises the combination of a permanent magnet and an electro-magnet.

5. A seal as claimed in claim 1 in which the gap is a circumferential gap which is divided into pockets by non-magnetic fences extending between the pole-pieces.

6. A seal as claimed in claim 1 in which the gap is partially closed on one side by an abradable sealing element extending from one of the pole pieces towards the rotatable structure.

7. A seal as claimed in claim 1 in which the fixed structure comprises part of the casing of a gas turbine engine and the rotatable structure comprises a turbine of a gas turbine engine, that part of the turbine extending into the gap comprising a fin.

8. A seal as claimed in claim 7 in which the fin is formed by a plurality of fin elements each one of which extends from the top of each blade of the turbine.

9. A seal as claimed in claim 7 in which the fin is formed on the upstream face of the turbine.

* * * * *